Oct. 2, 1923.

T. S. GRIMES

NUT CRACKING MACHINE

Filed April 14, 1923      5 Sheets-Sheet 1

1,469,641

INVENTOR.
Thaddeus S. Grimes,
BY
Geo. P. Kimmel
ATTORNEY.

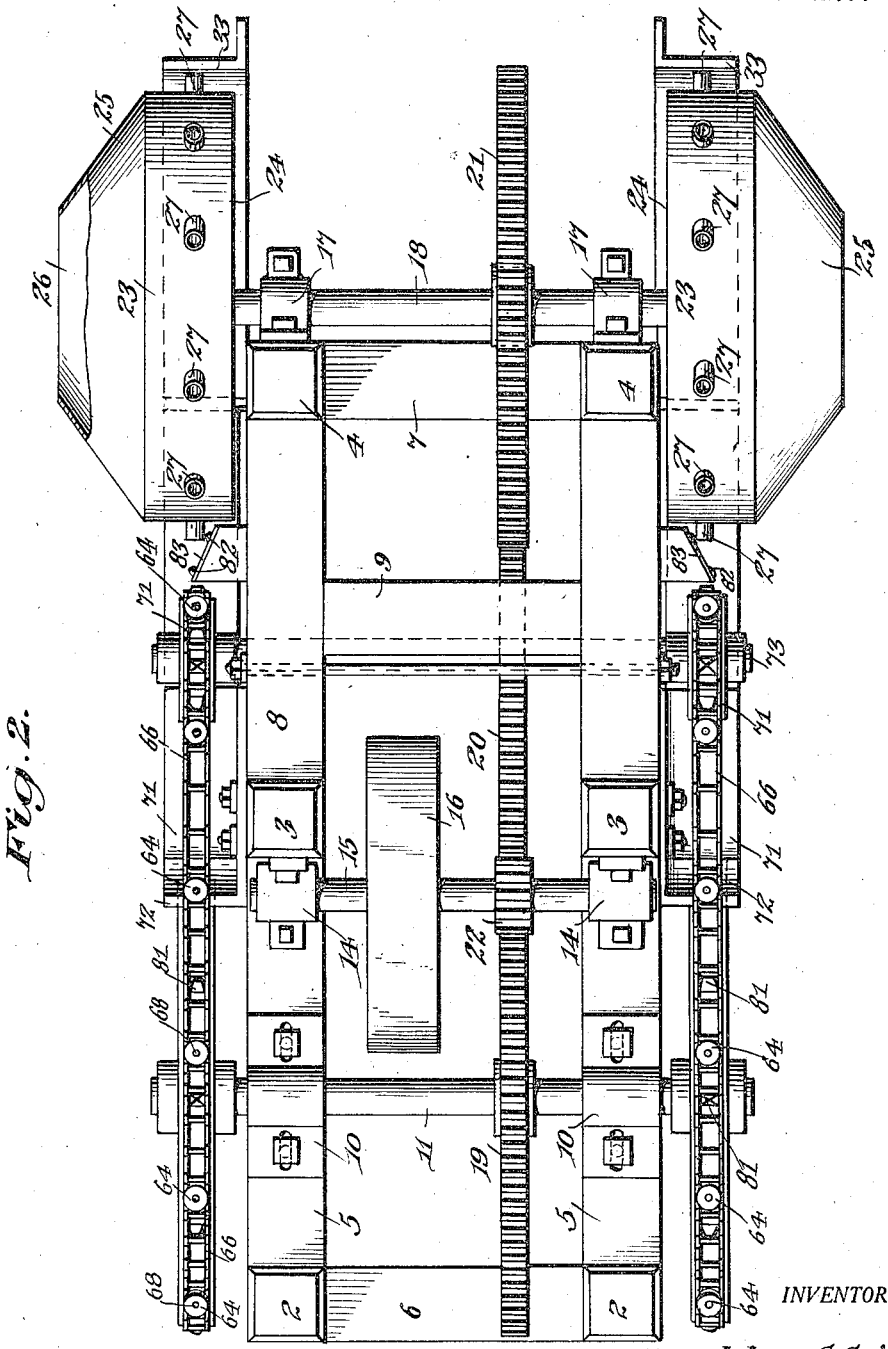

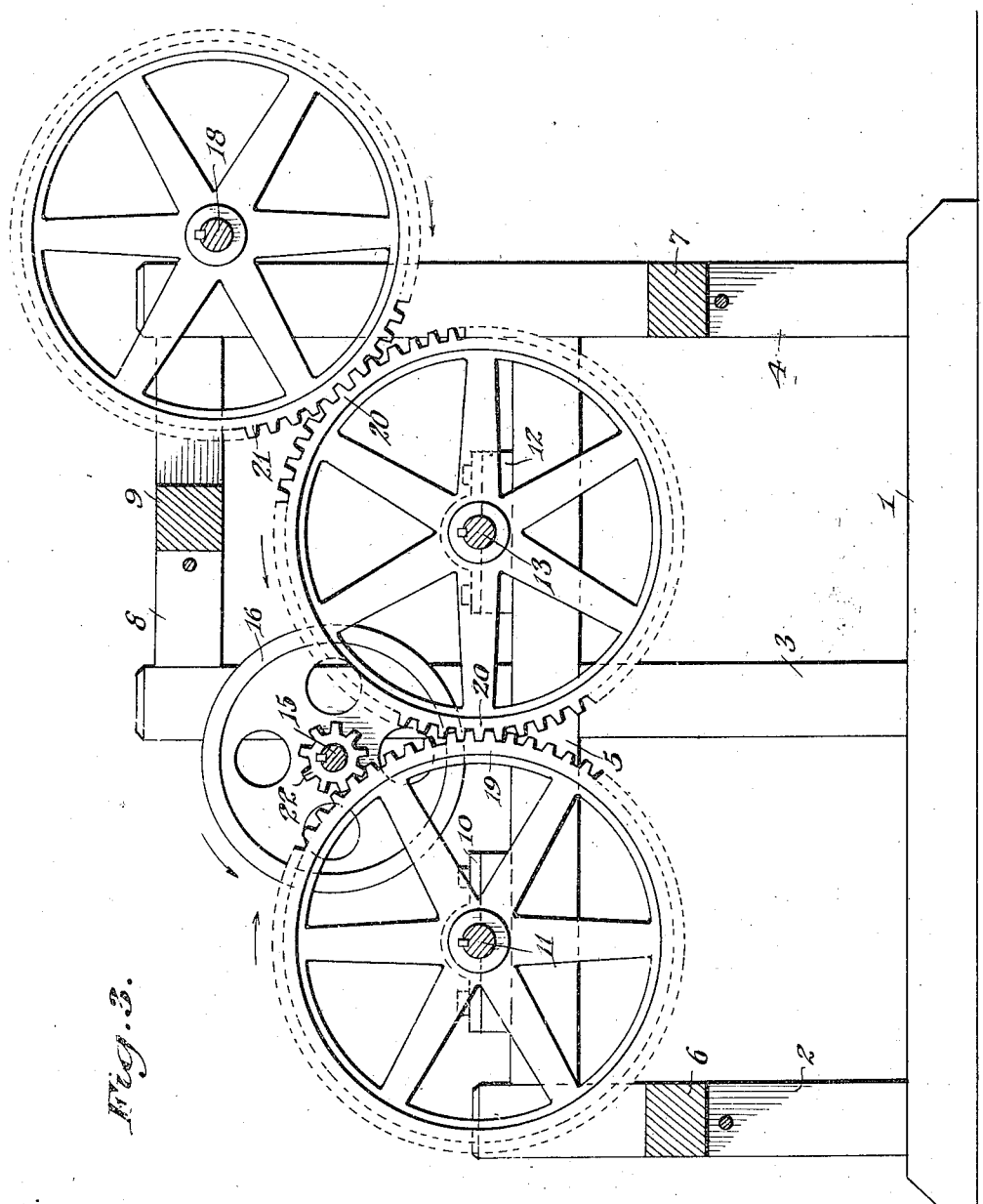

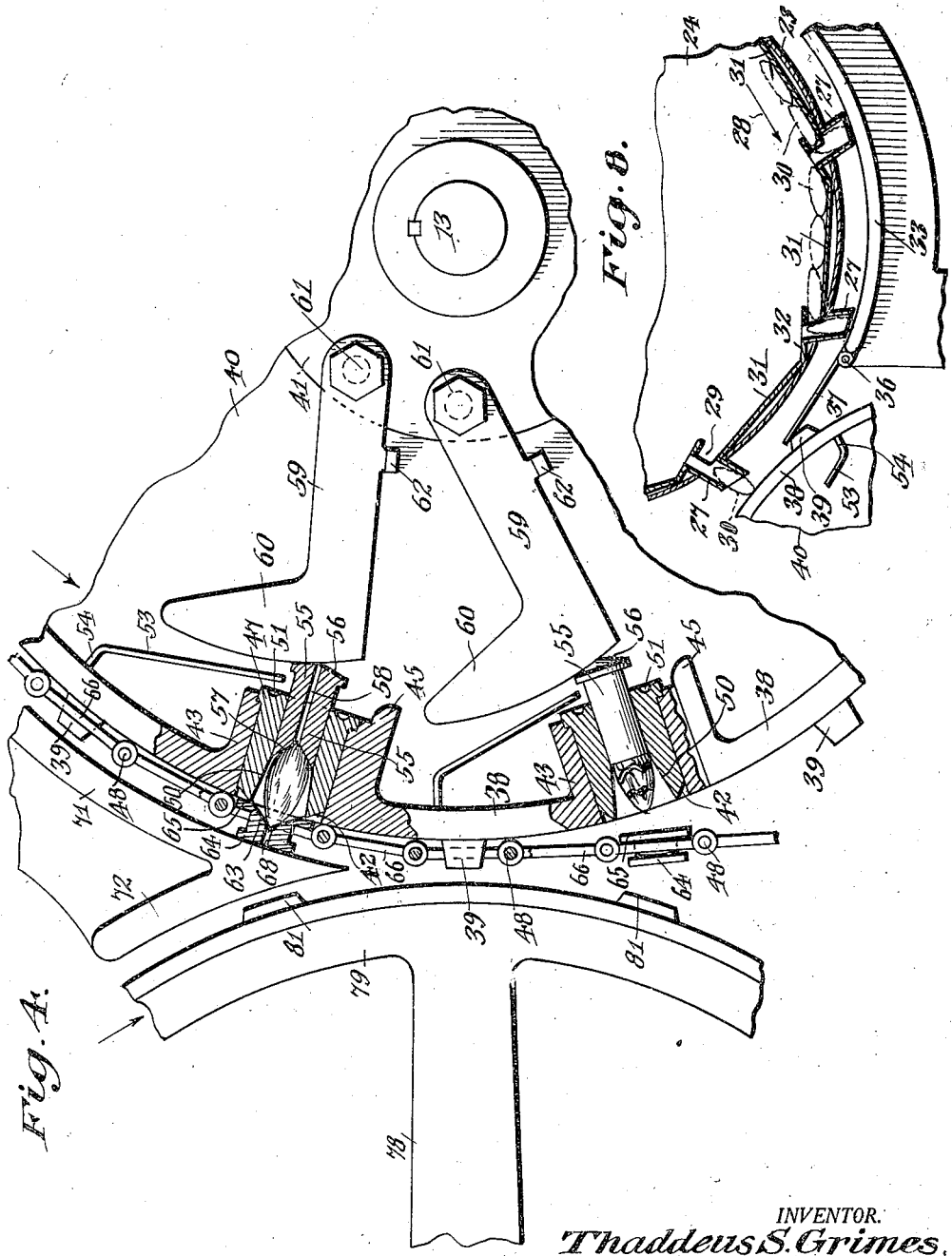

Oct. 2, 1923.
T. S. GRIMES
1,469,641
NUT CRACKING MACHINE
Filed April 14, 1923    5 Sheets-Sheet 5
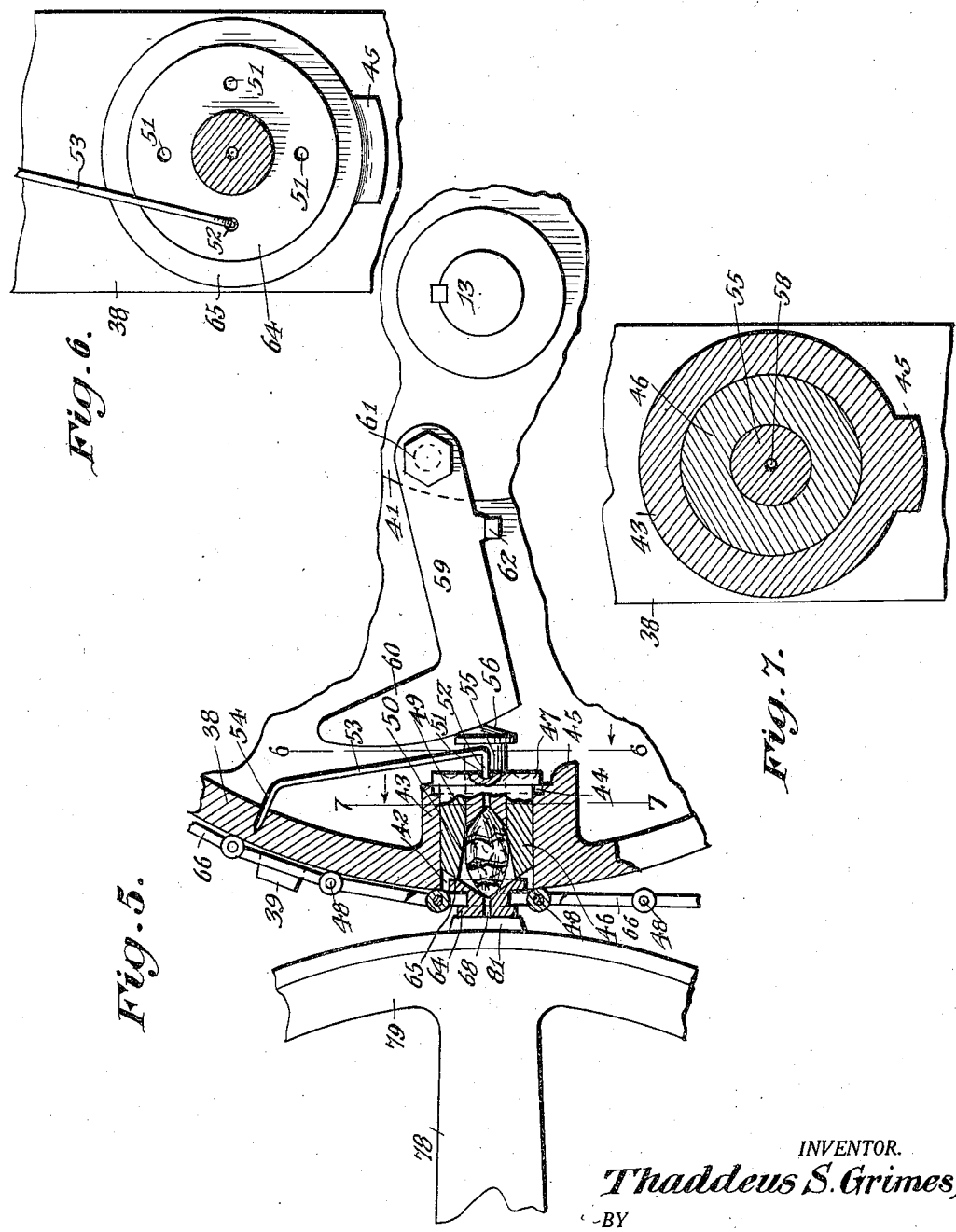
INVENTOR.
Thaddeus S. Grimes,
BY
Geo. P. Kimmel, ATTORNEY.

Patented Oct. 2, 1923.

1,469,641

UNITED STATES PATENT OFFICE.

THADDEUS S. GRIMES, OF COLUMBUS, GEORGIA, ASSIGNOR TO SIDNEY G. SIMONS, OF COLUMBUS, GEORGIA.

NUT-CRACKING MACHINE.

Application filed April 14, 1923. Serial No. 632,105.

*To all whom it may concern:*

Be it known that I, THADDEUS S. GRIMES, a citizen of the United States, residing at Columbus, in the county of Muscogee and State of Georgia, have invented certain new and useful Improvements in Nut-Cracking Machines, of which the following is a specification.

This invention relates to a nut cracking machine, and has for its object to provide, in a manner as hereinafter set forth, a machine of such class including means for receiving, transporting, positioning and cracking nuts successively, whether the nuts be of uniform or varying lengths, and further for delivering the cracked nuts, whereby the operation of the cracking of nuts and delivery of the cracked nuts is greatly facilitated, and further carried out at minimum expense.

Further objects of the invention are to provide a nut cracking machine which is simple in its construction and arrangement, strong, durable, compact, thoroughly efficient in its use, conveniently operated, readily installed, expeditious in its operation of cracking the nuts, and comparatively inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 2 is a top plan view thereof.

Figure 3 is a side elevation illustrating the driving mechanism of the machine.

Figure 4 is an enlarged fragmentary view, in section, illustrating the position of a nut prior to the cracking thereof and also illustrating a nut cracked.

Figure 5 is a view similar to Figure 4, illustrating the position of the nut during the cracking or crushing operation applied thereto.

Figure 6 is a section on line 6—6, Figure 5.

Figure 7 is a section on line 7—7, Figure 5.

Figure 8 is a fragmentary view, in section, of the feeding element.

Figure 1:
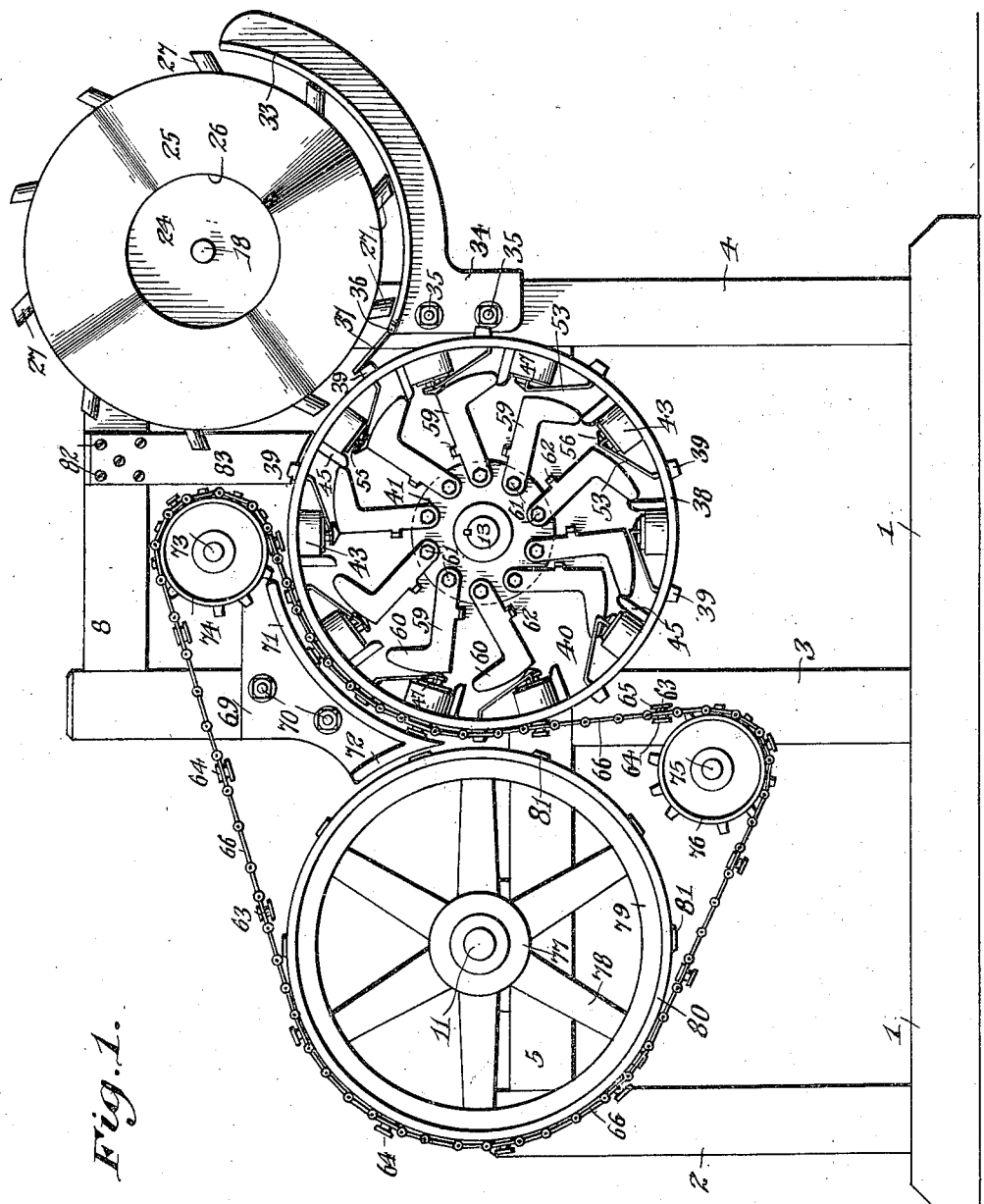
Figure 1 is a side elevation of a nut cracking machine, in accordance with this invention.

Referring to the drawings in detail, 1 denotes a base, preferably rectangular in contour, and which has extending upwardly therefrom, at each side thereof, a series of supporting standards 2, 3 and 4. The standard 3 is arranged between the standards 2 and 4, and the standards 3 and 4 are of the same height and of greater height than the standard 2. The standards 2, 3 and 4 are connected together by a longitudinally extending brace member 5. The standards 2 are connected together by a transversely disposed brace member 6. The standards 4 are connected together by a transversely extending brace member 7. The standard 3 is connected to the top of the standard 4 by a longitudinally disposed brace member 8. The brace members 8 are secured together by a transversely extending brace member 9.

Mounted on the brace members 5, between the standards 2 and 3, are bearings 10, in which is mounted a crushing or cracking element driving shaft 11, which projects outwardly from each of the brace members 5. Mounted on the brace members 5, between the standards 3 and 4 are bearings 12, in which is mounted a transversely extending carrier driving shaft 13, which projects outwardly from the brace members 5. Secured to each of the standards 3, is a bearing 14, in which is journaled a transversely extending operating shaft 15, carrying a pulley 16, driven from a prime mover. Carried by the standards 4, at the upper portions thereof, are bearings 17, in which is journaled a feeding element driving shaft 18, which projects outwardly from the bearing 17.

The shaft 11 is provided with a large gear wheel 19, which meshes with a large gear wheel 20, carried by the shaft 13, and the gear wheel 20 meshes with a large gear wheel 21, carried by the shaft 18. The shaft 15, is provided with a pinion 22, which meshes with the gear wheel 19 for operating the latter, thereby causing the operation of the shafts 11, 15 and 18.

A nut cracking machine in accordance with this invention, not only includes the supporting frame formed of the base 1 and elements 2 to 9, as well as the shafts 11, 15 and 18 and the driving elements for said shafts, but further includes a pair of synchronously operated feeding elements, a pair of combined holding elements associated with the feeding elements, a pair of synchronously operated carriers associated with the feeding elements, two sets of traveling compressing elements synchronously operated and associated with the carrier elements, a pair of combined guide and bearing elements associated with the compressing elements and carriers, and a pair of synchronously operated crushing or cracking elements associated with the compressing elements and with the carriers, and further includes a pair of deflecting elements associated with the carriers.

The feeding elements are arranged exteriorly of the standards 4 and on the ends of the shaft 18, and are revolved by the latter. The feeding elements are oppositely disposed with respect to each other, and as they are of the same construction, but one will be described, as the description of one will apply to the other.

Each of the feeding elements consists of an annular body portion 23, having a closed inner side 24, and a frustro-conical open outer side 25, and the opening formed by the side 25, which is indicated at 26, provides means whereby the nuts to be cracked can be supplied to the feeder element.

The body portion 23 has secured therewith a series of spaced tubular nut discharging members 27, which are open at each end and secured, intermediate their ends, to the body portion 23, whereby each of the members 27 will extend within, as well as project from the body portion 23. The members 27 are disposed at a rearward inclination with respect to the direction of movement of the feeding element. The direction of movement of the feeding element is indicated by the arrow 28, in Figure 8. The inner portion of each of the members 27, is cut away, as at 29, to provide an entrance opening for the nut 30. Secured to the inner face of the body portion 23, is a series of deflecting members 31 and each of which is formed with an angle shaped end 32, which is connected to and projects laterally from the inner end of a member 27, whereby the entrance opening 29, of the members 27, will be overlapped by the end portion 32 of the deflector 31. Each of the deflectors 31 extends from the lower wall of an entrance opening 29 of one member 27, to and extended over the inner end of an adjacent member 27. The angle shaped end portions 32, of a deflector, provide for the sliding of the nuts from off of the inner ends of the members 27 during the revolving of the feeding element. When the feeding element is operated the nuts slide along the deflectors 31 and enter the discharging members 27, through the openings 29, to a position whereby the nuts will extend lengthwise of the discharging members as shown in Figure 8. The outer end of each of the discharging members 27 is beveled, as clearly shown in Figure 8.

Associated with each of the feeding elements is a holding element, the function of which is to maintain the nuts in the discharging members 27, until the discharging members pass said holding elements for the purpose of delivering the nuts to the carrier elements. Each of the holding elements consists of an arcuate bar 33, which is L-shaped in cross section and has the horizontal leg thereof opposing and spaced from the body portion 23 of the feeding element. The bar 33 is formed with a depending extension 34, which is fixedly secured by the hold-fast devices 35 to the standard 4. The extensions 34 are arranged at the forward end of the bar 33, whereby when the latter is secured in position it will project rearwardly from the standard 4. Pivotally connected to the forward end of the bar 33, as at 36, is a hinged plate 37, which acts as a means for holding the nuts in a discharging member 27, until the latter arrives at its position to deliver the nut from the carrier. The plate 37 is shifted by the carrier in a manner to be presently referred to.

The carriers, as before stated, are synchronously operated, and they are carried on the outer end of the shaft 13 and arranged exteriorly of the standards 3 and 4, and as the construction of each of the carriers is the same, but one will be described, as the description of one will apply to the other.

Each of the carriers consist of a hollow annular member 38, provided with a circumferentially extending series of spaced lugs 39, and formed integral with the inner side of the member 38 is a web plate 40, having a hub element 41 secured therewith and which is fixedly connected to the shaft 13. The member 38 is formed with a series of spaced openings 42, disposed centrally thereof, and is furthermore formed with a series of inwardly extending sleeves 43, which are integral with the member 38 and each of which forms a continuation of the wall of an opening 42. The inner edge of each of said sleeves 43 is grooved as at 44, and also provided with a protuberance 45, for a purpose to be presently referred to.

Mounted in each of the openings 42, is a sleeve or bushing 46, having its inner end flanged, as at 47, for seating in the groove 44. The outer edge of the sleeve 46 is beveled, as at 48, and the sleeve 46 is set up so that the opening formed thereby will have a portion of its length cylindrical, as indicated at 49, and have the remaining portion of its length flared, as indicated at 50. The flared part of the opening formed by the sleeve 46, is arranged at the outer portion of the sleeve 46. The inner end of the sleeve 46 is provided with a series of recesses 51, into which is adapted to engage the angle shaped end 52 of a holding spring 53, the latter having its other end 54 secured in the inner face of the member 38.

Slidably mounted in each sleeve 46, is an anvil, in the form of a cylindrical plunger 55, which projects inwardly from the inner end of the sleeve 46 and is formed with an enlarged tapered head 56. The outer end of the plunger 55 has a tapered socket 57, with which communicates a bore 58 arranged centrally of the plunger 55.

Associated with each of the plungers 55, as well as bearing against the head thereof, and constituting an abutment to arrest inward movement of the plunger during the crushing or cracking operation, is a cam member comprising a shank 59, and a tapering extended head 60, which is disposed at right angles with respect to the shank 59 and further projects from one side of said shank 59. The shank 59 is pivotally connected, as at 61, to the hub element of the carrier, and that side of the shank 59, opposite to that side from which the head 60 projects is formed with a protuberance 62, in proximity to the pivot 61. The protuberances 62 of the cam members prevent said members from binding against each other during the operation of the carrier and further maintain the cam members in spaced relation with respect to each other during the movement of the carrier and as shown in Figure 1.

The protuberances 45, on the sleeves 43, act as means to shift the cam members away from each other after the crushing or cracking of a nut, and so that the cam members will be shifted away from each other the necessary distance to engage a plunger 55. In this connection, it will be stated that after the nut has been cracked or crushed, outward pressure on the plunger 55 is relieved and the plunger will move outwardly, due to the action of the cam members thereon, and when it is shifted outwardly its associated cam member will pass it and the cam members will assume the position shown in the lower left portion of Figure 1, that is to say, two cam members in close position to each other, and on a further movement of the carrier the protuberances 45 will engage the nose of the extension 60 and shift the cam member to the position shown at the right of the lower portion in Figure 1, and on a further movement of the carrier, the spring 50 will act to shift the plunger outward so that it will be engaged by a compressing element, and on a further movement on the carrier, the cam member will act as an abutment for the plunger during the cooperation with the plunger of a compressing element and a crushing or cracking element.

The lugs 39 of each carrier act to intermittently raise the hinged plate 37, so as to form a continuation of the bar 33, and to provide for the delivery of the nut at the proper point of the carrier and in advance of the lug 39.

As before stated, the machine includes two sets of compressing elements and which cooperate with the carrier elements and also with the crushing or cracking elements, and each set of compressing elements is shiftable not only through the means of the lugs 39, of the carrier elements, but also through the medium of the crushing or cracking elements, in a manner to be presently referred to, and as each set of compressing elements is of the same construction, but one will be described, as the description of one will apply to the other.

Each of the compressing elements of each set consists of a short cylindrical body portion 63, provided with an outer and an inner head, as indicated at 64, 65, and the said heads are of greater diameter than the body portion 63.

The compressing elements of each set are carried by an endless cog chain 66 and maintained in spaced relation thereby. The head 65 is arranged to oppose a carrier, and the head 64, in connection with the head 65 provides means to prevent the separation of a compressing element from the chain 66. The head 65 is of greater diameter than the head 64. Each of the compressing elements is provided with a tapering pocket 67 and which is arranged to oppose the carrier and also disposed as to register with the tapering part of the opening of the sleeve 46, as clearly shown in Figures 4 and 5, and when the compressing element is in position whereby the pocket 67 will oppose the part 50 of the opening in the sleeve 46, the head 65 of the compressing element will bear against the outer end of the sleeve 46, and when the parts are in the position as stated, to provide for the crushing or cracking of the nut, the compressing element, operated in a manner as hereinafter referred to, will be forced inwardly, shifting the sleeve 46 therewith and providing for the crushing or cracking of the nut between the compressing element and the plunger 55. During such operation, the plunger 55 is held from rearward shifting by the extension 60 of the cam member. Each of the compressing elements is provided with an axial bore 68, which aligns with the bore or opening 58, in the plunger 55, and the function of the bores 58 and 68 will be hereinafter referred to.

Secured to the outer side of each standard 3, near the top thereof and constructed to extend between a carrier and a crushing or cracking element, is a combined guide and bearing element and which consists of an angle shaped plate 69, fixedly secured in position by hold-fast devices 70. The plate 69, at its bottom, is formed with an arcuate flange 71, which opposes and is spaced from a carrier, and the bottom of said plate 69 is further provided with an arcuate flange 72, which opposes a crushing or cracking element. The flange 72 is of less length than the flange 71, and the latter is so arranged as to provide a bearing for the heads 64 of the compressing elements during the travel of the chain 66, and is furthermore so arranged as to provide a guide for the chain 66 as the latter is shifted by the engagement of the lugs 39 in the links of the chain.

Supported in any suitable manner from the rear upper corner of the plate 69, is a shaft 73, carrying an idler sprocket pinion 74, which engages in the chain 66.

Supported in any suitable manner from the lower portion of each of the standards 3, is a shaft 75 provided with an idler sprocket pinion 76, which engages in the chain 66.

As before stated, two crushing or cracking elements are employed and which are synchronously operated from the shaft 11, and as the construction of both of these elements is the same, but one will be described, as the description of one will apply to the other, and each of said elements opposes a carrier element, as well as being spaced therefrom, and is so set up that the space therebetween and the carrier element can be adjusted, and each of said elements consists of a hub 77 fixedly secured to the shaft 11, a series of spokes 78 projecting from the hub 77, a felly 79, and a rim 80 of greater width than the felly 79. The rim 80 has its outer face provided with a series of spaced lugs 81, which not only constitute means, in connection with the lugs 39, to operate or shift the chain 66, but further constitute crushing or cracking protuberances which cooperate with the compressing elements for shifting these latter inwardly with respect to the carrier, whereby the sleeves 46 are moved inwardly with respect to the sleeves 43, so as to crush or crack the nuts, owing to the collaborating of the plungers 55 with the compressing elements, as the plungers 55 are maintained stationary through the medium of the cam members.

Secured to each of the brace members 8, in proximity to a feeding element, through the medium of the hold-fast devices 82, is a depending deflector element or member 83, which is resilient, and is angularly disposed with respect to the body portion 38, and is employed for deflecting from the periphery of the body portion 38 any nuts that may drop thereon which otherwise would pass on under the chain 66 and be crushed and wasted, and further if two short nuts should drop out into a sleeve 46, the member 83 will deflect the top nut off from the carrier. The member 83 is resilient so that when its lower end is shifted by a lug 39, it will fly back to normal position after the lug 39 has cleared the lower end of the member 83.

The nuts are supplied into the revolving feeding elements, and as the nuts tumble around therein they fall into the delivery members 27. The delivery members 27 are only long enough to hold one nut at a time. As the feeding elements revolve, all the nuts fall away from the delivery members 27, other than those nuts which have entered said members, as the members approach the sleeves 46 in the carriers, and the operation of the feeding elements with respect to the carrier is so timed that the delivery members 27 come opposite to align with the sleeves 46, at which time the nuts fall from the delivery members 27 into the sleeves 46.

The feeding elements are so located in such position as will cause all the nuts to roll away from the delivery members 27 other than the nuts in said members, before the delivery members are opposite the sleeves 46.

The hinged plates 37, in connection with the bars 33, prevent the nuts from falling out of the delivery members 27, until they are at a predetermined position, or just as the delivery members 27 come opposite the sleeves 46. The hinged plates 37 hold the nuts in the delivery members 27, until the delivery members are more nearly at their nearest approach to the sleeves 46. This action could not be obtained if the rigid bars 33 were continued up to where the lugs 39 of the carrier elements would just miss said bars, and under such conditions, it is necessary to provide the hinged plates 37 to hold the nuts in the delivery members 27, until they are near to a center line drawn through the centers of the feeding elements and carrier elements.

The peripheral speeds of the carrier elements and the extreme ends of the delivery members 27 are the same, and this allows ample time for the nuts to drop from the delivery members 27 into the sleeves 46, while they are close together.

The delivery members 27 are of such size that the nuts have to pass through them end-wise which results in the nut being on end as it passes from the interior of the feeding element into the sleeves 46 and transferred in this position to the compressing elements carried by the chain 66. The chain 66 which carries the compressing elements is made to travel in unison with the carrier element through the medium of the lugs 39, and by this arrangement it causes the compressing elements to position themselves on the tops of the nuts in the sleeves 46 as they pass under sprocket pinion 74.

As the nuts pass on and down towards the crushing or cracking elements, the cam members of the carrier fall over and down, forcing the plungers 55 outwardly and clamping or collaborating the nuts between the plungers 55 and the compressing elements, and which are held from outward movement through the medium of the flange 71. This is best shown in Figure 4.

The sleeves 46 are held in place by the springs 53, and are allowed to recede with the compressing elements when the nuts are cracked.

As the nut approaches a line through the center of the crushing and carrier elements, the protuberances 81 come in contact with the compressing elements and the pressure from the protuberances 81 acting against the compressing elements will cause the crushing or cracking of the nuts. The operation of the crushing elements, with respect to the carrier elements, is so timed that the protuberances 81 will contact with the compressing elements when the nuts approach a line through the centers of the crushing and carrier elements. The crushing elements are slidably adjustable with respect to the carrier elements for controlling the amount of crushing to be given to the nuts for the best results.

The elements of the machine are so set up that it makes no difference as to the length of the nuts as to the amount of crushing that is done, because the cam members always clamp the nuts up tight against the compressing elements and hold the plungers from any movement backward by the compressing caused by the crushing elements, so that all the nuts, regardless of their length, are given the proper amount of crushing to break the shells sufficiently without injury to the meats. It is, of course, important to crack the nuts sufficiently to remove the shells without breaking the meats.

As the cracked nuts pass on down and the compressing elements with their chain leave the carrier element, the cam members pressing against the plungers force the nuts on and out of the sleeves 46, from the carrier element and so that the nuts can be caught in any convenient receptacle. As the carriers further revolve, the cam members are carried on, around and up and they fall down to the position as shown on the right of the going-up side of the carrier, and the plungers drop back against the cam members just before it is time for the nuts to drop into the sleeves 46.

The delivery members 27 are set at an angle to the surface of the body portion 23 of the feeding elements so as to cause the nuts to more readily drop out of the delivery members and into the sleeves 46, and the greater the angle of the delivery members, the lower the feeding element can be positioned in relation to the carrier.

The bore 58 in each of the plungers 55, as well as the bore 68 in each of the compressing elements, is provided for the reception of the sharp points of the nuts so as to allow the wall of the tapered pocket of the compressing element, and the wall of the tapered pocket 57 of the plunger to clamp against the body of the nut to insure more perfect collaborating. If these bores are not provided, then the small projections which are often on the ends of the nuts, would prevent the proper collaborating of the elements and under such conditions unsatisfactory cracking results.

The providing of the plunger 55 with the tapered socket 57, the latter being at an angle of approximately forty-five degrees, and said socket 57, in connection with the bore 58, provides for the reception of the point of the pecan, as the average pecan has a long point, so that the side of the nut will snugly fit the tapered socket. If the bore 58 was omitted, then in cracking the nut frequently the point of the nut only would be crushed and the shell would remain intact.

From the foregoing description taken in connection with the accompanying drawings, a nut cracking machine is set up which provides for the expeditious cracking of nuts at minimum expense, and although the preferred embodiment of the machine in accordance with this invention is as illustrated and described, yet it is to be understood that changes in the details of construction can be had which will fall within the light of the invention as claimed.

What I claim is:—

1. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, and a cracking element cooperating with said carrier element and provided with protuberances engageable with said compressing elements for operating them to crack the nuts.

2. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, and a cracking element cooperating with said carrier element and provided with protuberances engageable with said compressing elements for operating them to crack the nuts, a combined guide and bearing element for said comprising elements.

3. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, and a cracking element cooperating with said carrier element and provided with protuberances engageable with said compressing elements for operating them to crack the nuts, a combined guide and bearing element for said compressing elements, a holding element cooperating with said delivery members.

4. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, a cracking element cooperating with said carrier element and provided with protuberances engageable with said compressing elements for operating them to crack the nuts, a combined guide and bearing element for said compressing elements, and a holding element cooperating with said delivery members and including a hinged plate shiftable from the carrier element.

5. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, a cracking element cooperating with said carrier element and provided with protuberances engageable with said compressing elements for operating them to crack the nuts, and a holding element cooperating with said delivery members and including a hinged plate shiftable from said carrier element.

6. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, a cracking element cooperating with said carrier element and provided with protuberances engageable with said compressing elements for operating them to crack the nuts, and a resilient deflector arranged in advance of said feeding element and over said carrier element.

7. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, a cracking element cooperating with said carrier element and provided with protuberances engageable with said compressing elements for operating them to crack the nuts, a combined guide and bearing element for said compressing elements, and a resilient deflector arranged in advance of said feeding element and over said carrier element.

8. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, a cracking element cooperating with said carrier element and provided with protuberances engageable with said compressing elements for operating them to crack the nuts, a combined guide and bearing element for said compressing elements, a holding element cooperating with said delivery members, and a resilient deflector arranged in advance of said feeding element and over said carrier element.

9. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, a cracking element cooperating with said carrier element and provided with protuberances engageable with said compressing elements for operating them to crack the nuts, a combined guide and bearing element for said compressing elements, a holding element cooperating with said delivery members and including a hinged plate shiftable from the carrier element, and a resilient deflector arranged in advance of said feeding element and over said carrier element.

10. A nut cracking machine comprising a nut feeding element provided with nut delivery members, a carrier element arranged in cooperative relation with respect to said feeding element and provided with shiftable sleeves for the reception of the delivered nuts and further provided with retained abutments arranged in said sleeves, traveling compressing elements cooperating with said sleeves and abutments for cracking the nuts, a cracking element cooperating with said carrier element and provided with protuberances engageable with said compressing elements for operating them to crack the nuts, a holding element cooperating with said delivery members and including a hinged plate shiftable from said carrier element, and a resilient deflector arranged in advance of said feeding element and over said carrier element.

11. A nut cracking machine comprising a nut feeding element, a carrier element for receiving the nuts from the feeding element and for transporting them to position for cracking, a nut cracking element, means for synchronously operating the said elements, a set of compressing elements traveling between said carrier and cracking elements, said carrier and cracking elements having means associating with said set of compressing elements for shifting the same, and said carrier and cracking elements further having means associated with the compressing elements for successively cracking the nuts.

12. A nut cracking machine comprising a nut feeding element, a carrier element for receiving the nuts from the feeding element and for transporting them to position for cracking, a nut cracking element, means for synchronously operating the said elements, a set of compressing elements traveling between said carrier and cracking elements, said carrier and cracking elements having means associating with said set of compressing elements for shifting the same, said carrier and cracking elements further having means associated with the compressing elements for successively cracking the nuts, a combined guide and bearing for said set of compressing elements and a nut holding element associated with said feeding element.

13. A nut cracking machine comprising a nut feeding element provided with a plurality of angularly disposed nut delivery members, a carrier element arranged in cooperative relation with respect to said feeding element and provided with shiftable sleeves for the reception of the delivered nuts and further provided with cam controlled abutments arranged in said sleeves, an endless chain provided with a plurality of compressing elements cooperating with said sleeves and abutments for cracking the nuts, and a nut cracking element cooperating with said carrier element and provided with protuberances engaging with said compressing elements for operating them to crack the nuts, and said cracking element and carrier element provided with means engaging in said chain for shifting it, causing thereby the travel of the compressing elements during the operation of the carrier and cracking elements, and means for operating the carrier, feeding and cracking elements.

14. A nut cracking machine comprising a nut feeding element provided with a plurality of angularly disposed nut delivery members, a carrier element arranged in cooperative relation with respect to said feeding element and provided with shiftable sleeves for the reception of the delivered nuts and further provided with cam controlled abutments arranged in said sleeves, an endless chain provided with a plurality of compressing elements cooperating with said sleeves and abutments for cracking the nuts, a nut cracking element cooperating with said carrier element and provided with protuberances engaging with said compressing elements for operating them to crack the nuts, and said cracking element and carrier element provided with means engaging in said chain for shifting it, causing thereby the travel of the compressing elements during the operation of the carrier and cracking elements, means for operating the carrier, feeding and cracking elements, a combined guide and bearing for said compressing elements, and a holding element cooperating with said delivery members.

15. A nut cracking machine comprising a nut feeding element provided with a plurality of angularly disposed nut delivery members, a carrier element arranged in cooperative relation with respect to said feeding element and provided with shiftable sleeves for the reception of the delivered nuts and further provided with cam controlled apertured abutments arranged in said sleeves, an endless chain provided with a plurality of apertured compressing elements cooperating with said sleeves and abutments for cracking the nuts, and a nut cracking element cooperating with said carrier element and provided with protuberances engaging with said compressing elements for operating them to crack the nuts, and said cracking element and carrier element provided with means engaging in said chain for shifting it, causing thereby the travel of the compressing elements during the operation of the carrier and cracking elements, and means for operating the carrier, feeding and cracking elements.

16. A nut cracking machine comprising a nut feeding element provided with a plurality of angularly disposed nut delivery members, a carrier element arranged in cooperative relation with respect to said feeding element and provided with spring controlled shiftable sleeves for the reception of the delivered nuts and further provided with cam controlled abutments arranged in said sleeves, an endless chain provided with a plurality of compressing elements cooperating with said sleeves and abutments for cracking the nuts, and a nut cracking element cooperating with said carrier element and provided with protuberances engaging with said compressing elements for operating them to crack the nuts, and said cracking element and carrier element provided with means engaging in said chain for shifting it, causing thereby the travel of the compressing elements during the operation of the carrier and cracking elements, and means for operating the carrier, feeding and cracking elements.

17. A nut cracking machine comprising a nut feeding element provided with a plurality of angularly disposed nut delivery members, a carrier element arranged in cooperative relation with respect to said feeding element and provided with shiftable sleeves for the reception of the delivered nuts and further provided with cam controlled apertured abutments arranged in said sleeves, an endless chain provided with a plurality of apertured compressing elements cooperating with said sleeves and abutments for cracking the nuts, and a nut cracking element cooperating with said carrier element and provided with protuberances engaging with said compressing elements for operating them to crack the nuts, and said cracking element and carrier element provided with means engaging in said chain for shifting it, causing thereby the travel of the compressing elements during the operation of the carrier and cracking elements, means for operating the carrier, feeding and cracking elements, a combined guide and bearing element for said compressing elements, and a holding element cooperating with said delivery members.

18. A nut cracking machine comprising a nut feeding element provided with a plurality of angularly disposed nut delivery members, a carrier element arranged in cooperative relation with respect to said feeding element and provided with spring controlled shiftable sleeves for the reception of the delivered nuts and further provided with cam controlled abutments arranged in said sleeves, an endless chain provided with a plurality of compressing elements cooperating with said sleeves and abutments for cracking the nuts, a nut cracking element cooperating with said carrier element and provided with protuberances engaging with said compressing elements for operating them to crack the nuts, and said cracking element and carrier element provided with means engaging in said chain for shifting it, causing thereby the travel of the compressing elements during the operation of the carrier and cracking elements, means for operating the carrier, feeding and cracking elements, a combined guide and bearing element for said compressing elements and positioned between the cracking and carrier elements, and a holding element cooperating with said delivery member and including a hinged plate extended on and intermittently shifted by said carrier element.

In testimony whereof, I affix my signature hereto.

THADDEUS S. GRIMES.